(12) United States Patent
Burns et al.

(10) Patent No.: US 7,849,001 B2
(45) Date of Patent: Dec. 7, 2010

(54) METHOD, APPARATUS AND INTERFACE FOR TRANSACTION TOGGLING

(75) Inventors: Michael J. Burns, Chicago, IL (US); Joan Ebersole, Glen Ellyn, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 12/838,631

(22) Filed: Jul. 19, 2010

(65) Prior Publication Data

US 2010/0287089 A1 Nov. 11, 2010

Related U.S. Application Data

(63) Continuation of application No. 10/330,464, filed on Dec. 27, 2002, now Pat. No. 7,792,734.

(51) Int. Cl.
*G06Q 40/00* (2006.01)

(52) U.S. Cl. ............................ 705/37; 705/26; 705/35; 705/36 R; 705/38

(58) Field of Classification Search ................ 705/26, 705/35, 36 R, 37, 38
See application file for complete search history.

(56) References Cited

U.S. PATENT DOCUMENTS

| | | | | |
|---|---|---|---|---|
| 3,573,747 | A * | 4/1971 | Adams et al. ................ | 705/37 |
| 4,674,044 | A | 6/1987 | Kalmus et al. | |
| 4,750,135 | A | 6/1988 | Boilen | |
| 4,903,201 | A | 2/1990 | Wagner | |
| 5,038,284 | A | 8/1991 | Kramer | |
| 5,077,665 | A | 12/1991 | Silverman et al. | |
| 5,101,353 | A | 3/1992 | Lupien et al. | |
| 5,136,501 | A | 8/1992 | Silverman et al. | |
| 5,270,922 | A | 12/1993 | Higgins | |
| 5,297,031 | A | 3/1994 | Gutterman et al. | |
| 5,297,032 | A | 3/1994 | Trojan et al. | |
| 5,689,651 | A | 11/1997 | Lozman | |
| 5,774,877 | A | 6/1998 | Patterson, Jr. et al. | |
| 5,793,301 | A | 8/1998 | Patterson, Jr. et al. | |
| 5,797,002 | A | 8/1998 | Patterson, Jr. et al. | |
| 5,845,266 | A * | 12/1998 | Lupien et al. ............. | 705/36 R |
| 5,915,245 | A * | 6/1999 | Patterson, Jr. et al. ......... | 705/35 |
| 5,924,082 | A * | 7/1999 | Silverman et al. ............. | 705/37 |
| 5,924,083 | A | 7/1999 | Silverman et al. | |
| 5,946,667 | A | 8/1999 | Tull, Jr. et al. | |
| 5,963,923 | A | 10/1999 | Garber | |
| 6,012,046 | A | 1/2000 | Lupien et al. | |

(Continued)

FOREIGN PATENT DOCUMENTS

EP    1067471    1/2001

(Continued)

*Primary Examiner*—Ella Colbert
*Assistant Examiner*—Sanjeev Malhotra
(74) *Attorney, Agent, or Firm*—McDonnell Boehnen Hulbert & Berghoff LLP (57) ABSTRACT

A method for submitting transactions from an automated trading tool to an electronic exchange. The method includes defining a proximity limit and automatically generating a transaction for a tradeable object. The method further includes applying the proximity limit to the transaction. When the transaction falls within the defined proximity limit, the transaction is submitted to the exchange. An apparatus and interface for transaction toggling based on proximity limits are also provided.

21 Claims, 5 Drawing Sheets

U.S. PATENT DOCUMENTS

| | | | |
|---|---|---|---|
| 6,014,643 A * | 1/2000 | Minton | 705/36 R |
| 6,035,287 A | 3/2000 | Stallaert et al. | |
| 6,098,051 A * | 8/2000 | Lupien et al. | 705/36 R |
| 6,131,087 A * | 10/2000 | Luke et al. | 705/26 |
| 6,134,535 A | 10/2000 | Belzberg | |
| 6,195,647 B1 | 2/2001 | Martyn et al. | |
| 6,272,474 B1 | 8/2001 | Garcia | |
| 6,278,982 B1 * | 8/2001 | Korhammer et al. | 705/36 R |
| 6,282,521 B1 | 8/2001 | Howorka | |
| 6,343,278 B1 * | 1/2002 | Jain et al. | 705/36 R |
| 6,408,282 B1 | 6/2002 | Buist | |
| 6,418,419 B1 | 7/2002 | Nieboer et al. | |
| 6,421,653 B1 | 7/2002 | May | |
| 6,519,574 B1 | 2/2003 | Wilton et al. | |
| 6,766,304 B2 | 7/2004 | Kemp, II et al. | |
| 6,772,132 B1 | 8/2004 | Kemp, II et al. | |
| 6,938,011 B1 | 8/2005 | Kemp, II et al. | |
| 7,177,833 B1 * | 2/2007 | Marynowski et al. | 705/38 |
| 7,243,083 B2 * | 7/2007 | Burns et al. | 705/37 |
| 7,251,629 B1 * | 7/2007 | Marynowski et al. | 705/37 |
| 7,389,268 B1 | 6/2008 | Kemp, II et al. | |
| 2002/0023038 A1 | 2/2002 | Fritsch et al. | |
| 2002/0046146 A1 | 4/2002 | Otero et al. | |
| 2002/0046149 A1 | 4/2002 | Otero et al. | |
| 2002/0046151 A1 | 4/2002 | Otero et al. | |
| 2002/0046156 A1 | 4/2002 | Horn et al. | |
| 2002/0049661 A1 | 4/2002 | Otero et al. | |
| 2002/0055899 A1 | 5/2002 | Williams | |
| 2002/0059129 A1 | 5/2002 | Kemp et al. | |
| 2002/0099644 A1 | 7/2002 | Kemp et al. | |
| 2002/0128950 A1 | 9/2002 | Wu et al. | |
| 2002/0138401 A1 | 9/2002 | Allen et al. | |
| 2002/0174055 A1 | 11/2002 | Dick et al. | |
| 2002/0188555 A1 | 12/2002 | Lawrence | |
| 2003/0004852 A1 | 1/2003 | Burns | |
| 2003/0023542 A1 | 1/2003 | Kemp et al. | |
| 2003/0033235 A1 | 2/2003 | Hummelgren | |
| 2003/0200167 A1 * | 10/2003 | Kemp et al. | 705/37 |
| 2003/0236737 A1 | 12/2003 | Kemp et al. | |
| 2004/0177024 A1 * | 9/2004 | Bok et al. | 705/37 |
| 2007/0156574 A1 * | 7/2007 | Marynowski et al. | 705/37 |

FOREIGN PATENT DOCUMENTS

| | | |
|---|---|---|
| EP | 1104904 | 6/2001 |
| EP | 1217564 | 6/2002 |
| EP | 1246111 | 10/2002 |
| WO | 91/14231 | 9/1991 |
| WO | 98/49639 | 11/1998 |
| WO | 99/19821 | 4/1999 |
| WO | 99/30259 | 6/1999 |
| WO | 99/53424 | 10/1999 |
| WO | 00/51043 | 8/2000 |
| WO | 00/52619 | 9/2000 |
| WO | 00/62187 | 10/2000 |
| WO | 00/65510 | 11/2000 |
| WO | 01/16830 | 3/2001 |
| WO | 01/16852 | 3/2001 |
| WO | 01/22266 | 3/2001 |
| WO | 01/22315 | 3/2001 |
| WO | 01/65403 | 9/2001 |
| WO | 01/88808 | 11/2001 |
| WO | 02/15461 | 2/2002 |
| WO | 02/29686 | 4/2002 |
| WO | 02/33621 | 4/2002 |
| WO | 02/33623 | 4/2002 |
| WO | 02/33635 | 4/2002 |
| WO | 02/33636 | 4/2002 |
| WO | 02/33637 | 4/2002 |
| WO | 02/47006 | 6/2002 |
| WO | 02/079940 | 10/2002 |
| WO | 02/080433 | 10/2002 |
| WO | 02/097580 | 12/2002 |
| WO | 02/103601 | 12/2002 |
| WO | 03/090032 | 10/2003 |

* cited by examiner

FIG. 1

| | Spread Market | |
|---|---|---|
| Bid | Price | Ask |
| | 11 | 1 |
| | 9 | 6 |
| | 7 | 17 |
| | 5 | 23 |
| 14 | 3 | |
| 6 | 1 | |
| 5 | -1 | |
| 1 | -3 | |
| 302 | 304 | 306 |

|  | Product B |  |
|---|---|---|
| Bid | Price | Ask |
|  | 12 | 21 |
|  | 11 | 10 |
|  | 10 | 5 |
|  | 9 | 14 |
| 29 | 8 |  |
| 18 | 7 |  |
| 6 | 6 |  |
| 1 | 5 |  |

Proximity Limit-1 tick 324

310     314     318

Proximity Limit 3-ticks 326

FIG. 3C

METHOD, APPARATUS AND INTERFACE FOR TRANSACTION TOGGLING

CROSS REFERENCE TO RELATED APPLICATIONS

This application is a continuation of U.S. patent application Ser. No. 10/330,464, filed on Dec. 27, 2002, the entire contents of which are incorporated herein by reference.

FIELD OF THE INVENTION

The present invention is generally directed to electronic trading, and in particular, facilitates trading of any tradeable object in an electronic trading environment.

BACKGROUND

Trading methods have evolved from a manually intensive process to a technology enabled, electronic platform. Advances in technology are having an increasingly large and broad impact on trading and the way in which exchanges conduct business. What was previously seen as just a supplement to the traditional pit trading, electronic trading platforms continue to increase in importance and popularity. The advent of electronic trading has meant that a customer can be in virtually direct contact with the market, from practically anywhere in the world, performing near real-time transactions, and without the need to make personal contact with a broker. Electronic trading systems are also convenient for floor brokers on the floor at an exchange for receiving orders electronically.

Exchanges and auction houses that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers that are linked together. There are many types of networks such as local area networks (LANs) and wide area networks (WANs). Networks can also be characterized by topology, protocol, and architecture. However, any type of network configuration, including LAN/WAN combinations, can be used in electronic trading. For example, some market participants may link to the host through a direct connection such as a T1 or ISDN. Some participants may link to the exchange through direct connections and through other common network components such as high-speed servers, routers, and gateways, and so on. As another example, the Internet can be used to establish a connection between the client and the host. There are many different types of networks, and combinations of network types, known in the art that can link market participants to the host.

Regardless of the way in which a connection is established, software running on the clients, or a server supporting the clients, allows people to log onto one or more exchanges and participate in one or more markets. A client is a terminal or computer that accesses one or more networks. For example, a client can be a personal computer, laptop computer, hand-held computer, workstation and so on. Some clients run software that creates specialized interactive trading screens. In general, the trading screens enable people to enter orders into the market, obtain market quotes, and monitor positions. The range and quality of features available varies according to the specific software application being run.

Trading software may also create specialized interactive trading screens. The trading screens enable the traders to enter orders, obtain market quotes, monitor positions and receive fill information, while the trader implements various trading strategies, including those previously used on the floor of an exchange. Such strategies incorporated into an electronic marketplace may improve the speed, accuracy, and ultimately the profitability of trading electronically. One such trading strategy is spread trading.

Spread trading is the buying, selling, or combination of buying and selling, of two or more tradeable objects, the purpose of which is to capitalize on changes or movements in the relationships between the tradeable objects. A spread trade may involve buying two or more tradeable objects, buying one or more tradeable objects and selling one or more tradeable objects, selling two or more tradeable objects, or some combination thereof. For example, the tradeable objects being spread may be contracts for different delivery months (expiration dates) of the same tradeable object, or contracts of the same tradeable object at different strike prices. But spread trades sometimes involve different tradeable objects or the same tradeable object on different exchanges.

Spread trading is usually less risky than other types of trading strategies such as position trades, because a position is protected where an investment is made by taking an offsetting position in a related product in order to reduce the risk of adverse price movements. For example, a trader might simultaneously buy and sell options of the same class at different strike prices and/or expiration dates. Of course, there are many other reasons for spread trading, and there are many known varieties of spread trading techniques.

With the advent of electronic trading, trading strategies such as spread trading can be incorporated into the electronic marketplace. However, the success of a trader who trades in a competitive electronic trading environment may depend on many factors. Among those factors are the speed in calculating what tradeable objects to quote, the speed in calculating what price to quote at, and the speed in calculating how much to quote. Because speed is of great importance, it is desirable for electronic trading systems to offer tools that can assist a trader in trading in an electronic marketplace, and help the trader to make trades at the most favorable prices in a speedy and accurate manner.

Sometimes traders also use a separate spreadsheet program or another similar program to receive market data feeds and to generate numbers, based on those feeds, which the traders can use to determine whether to buy and/or sell tradeable objects. Then, in response to the generated numbers, the trader can manually enter and execute orders into a trading application. Instead of manual order entry, some traders use a more brute force approach with often limited flexibility by linking a spreadsheet program directly to a trading application. Orders are then automatically entered and executed by the trading application based on the generated numbers. Use of spreadsheets and trading applications in this manner does allow traders to enter orders raster than using traditional methods of order entry and execution.

However, to profit in today's rapidly moving markets, traders must be able to react more quickly and assimilate an enormous amount of data. For example, a trader may have to assimilate market data, world news, business news, and so on before making trades. Consequently, a skilled trader with the quickest software, the fastest communications, and the most sophisticated analysis can significantly improve the trader's own or the trader's firm's bottom line. The slightest advantage in speed or ability to assimilate information can generate significant returns in a fast moving market. Therefore, in today's fast and dynamically changing markets, a trader lacking a technologically advanced interface is at a severe competitive disadvantage. Prior use of such programs is still an inadequate solution to handle the dynamics of such a fast moving market.

BRIEF DESCRIPTION OF THE FIGURES

The presently preferred embodiments are described herein with reference to the drawings, in which.

DETAILED DESCRIPTION

In accordance with the presently preferred embodiments, tools are provided to assist a trader in limiting the number of transactions, e.g., orders, quotes, etc., submitted in an electronic trading environment. In this context, a trader is anyone who participates in trading tradeable objects. A tradeable object, as that term is used herein, refers simply to anything that can be traded with a quantity and/or price. It includes all types of tradeable objects, including but not limited to financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange or auction house for trading, or "synthetic," such as a combination of real products that is created by a trader or other user. The present embodiments, which generically may be referred to herein as a "transaction toggler," are provided to facilitate automated trading and are, in addition, particularly suitable for the automatic trading of spreads. Other applications for the transaction toggler, however, will be apparent from the following detailed description.

In the following sections of this detailed description, an overview of an electronic trading network is presented, followed by an illustration of spread trading over the electronic trading network. Next, the transaction toggling method is described. An embodiment of an interface for use with the transaction toggling method is thereafter presented. Finally, some alternative embodiments are described.

1. General Overview of an Electronic Network

Figure 1:
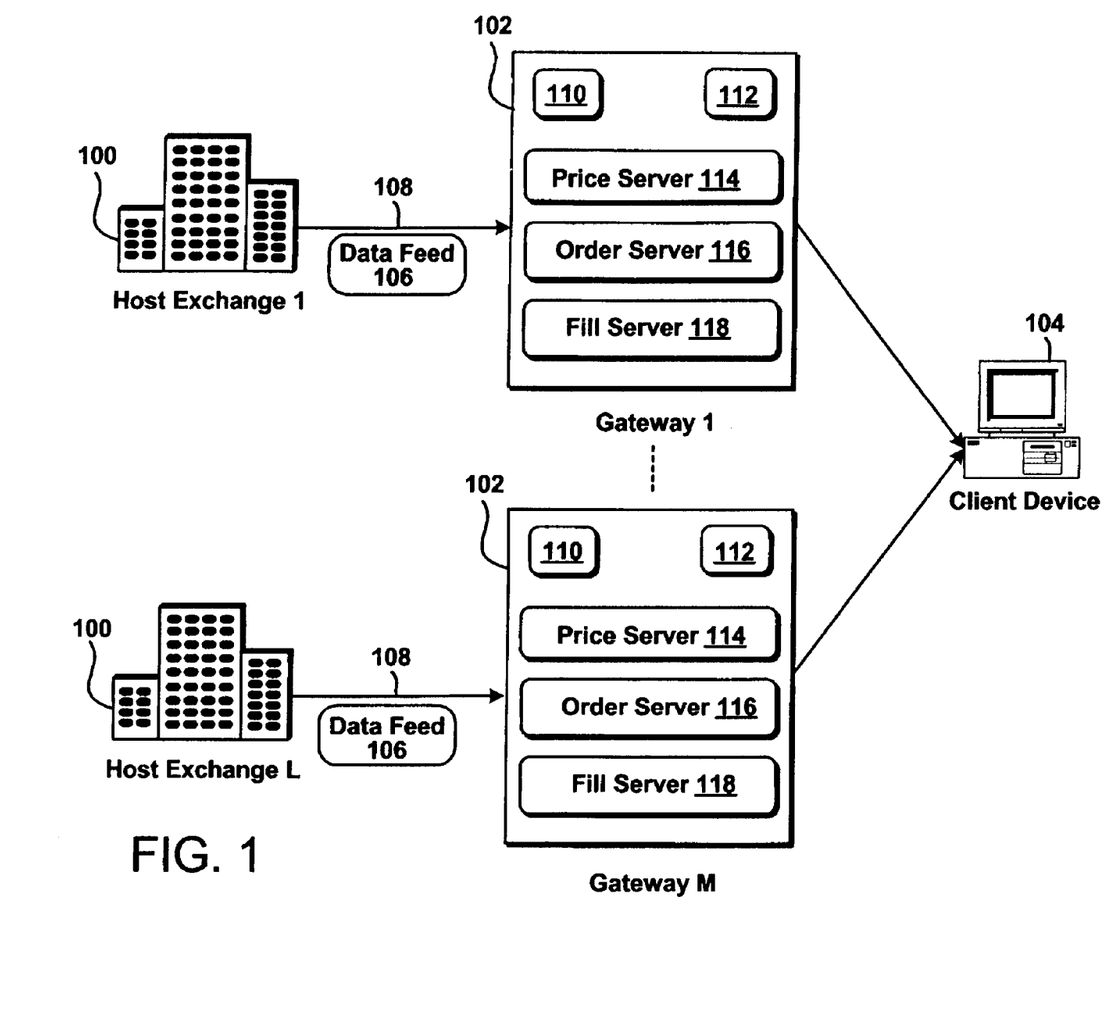
FIG. 1 shows an example host exchange, gateway, and client device that implements the trading of tradeable objects.

FIG. 1 shows an example host exchange, gateway, and client device that implements the trading of tradeable objects. In a typical implementation, the system generally includes a host exchange 100, a gateway 102, and a client device 104. Preferably, the system can support up to X host exchanges, Y gateways 102, and Z client devices (although X host exchanges, Y gateways, and Z client devices are not shown for sake of clarity), where X, Y, and Z represent any number. In an illustrative embodiment, X and Y may be the same number such that there is a one-to-one correspondence between host exchanges 100 and gateways 102, but such numerical correspondence is not required. In addition, as will be recognized by those skilled in the art, a single physical structure (e.g., a server) may, with appropriate programming/firmware, serve as multiple gateways.

Examples of host exchanges 100 include an Electronic Communication Network (ECN) like Island, which is a well-known electronic trading facility. Another host exchange 100 might be, for example, the Chicago Mercantile Exchange (CME), the Xetra (a German stock exchange), or the European derivatives market (Eurex). The preferred embodiments are not limited, however, to any particular exchange, and it should be understood that any entity that provides electronic market information, accepts electronic orders, and/or provides order status information may function as the host exchange. For example, the host exchange 100 alternatively may be an electronic auction house.

As known in the art, the gateway 102 is one or more computers (or program(s)) running software that receives information from the host exchange in the form of price information, order information, and fill information. Also known in the art, the client device 104 is a computer, workstation or equivalent device that receives one or more data feeds from the gateway 102. The host exchanges 100, gateways 102, and client device 104 are explained below in their respective sections.

FIG. 1 illustrates one particular network arrangement among many configurations that are known to those skilled in the art. It should be understood that the preferred embodiments are not limited to any particular network architecture, but rather may be applied with utility on any electronic device in any network that can be used for electronic trading. Furthermore, the preferred embodiments are not limited to a completely electronic trading environment where orders are sent to an electronic matching engine. For example, the invention could be utilized with an electronic trading application that sends orders electronically to a terminal where a person (e.g., a floor broker) executes or represents those orders in a traditional open outcry trading floor.

Host Exchange

Each different host exchange 100 typically provides different types of information, and relays this information, or some portion thereof, collectively referred to as a data feed, over a network to market participants or traders. A data feed from one exchange may contain different information, e.g. representing different tradeable objects, than another data feed from a second exchange. Different host exchanges may also provide different amounts of information, e.g. market depth away from the inside market, and may provide information in different formats. However, it is not necessary in the preferred embodiments that the data feeds from exchanges either include the same data or different data.

In general, a data feed 106 may include information representing prices and/or quantities for a tradeable object. For example, for a futures contract the data feed 106 could include data relating to the "inside market" and/or data relating to "market depth." The inside market is the highest bid price and the lowest ask price available in the market. Data feeds 106 from some exchanges also include data corresponding to quantities available at the inside market prices and at other prices—this may be called the market depth. Market depth may be represented by the available order book, including all the current bid and ask quantities and their associated prices, or any portion thereof. In other words, market depth is at least a portion of the available pending bid and ask quantities entered at a particular price. The data feed 106 can contain other types of market information, such as the last traded price (LTP), the last traded quantity (LTQ), total traded quantity (TTQ), order information, and/or fill information. The information in a data feed 106, whether it contains the inside market and/or market depth or more market information, is generally categorized into three groups referred to as price, order, and fill information.

In one embodiment, each host exchange 100 sends a data feed 106 to a gateway 102. The data feed 106 preferably carries all of the information that the exchange 100 provides, such as price, order, and fill information, and alternatively may include more information. The host exchange 100 may send its data feed 106 to the gateway 102 over a dedicated line 108, which is a communication channel that permanently connects the exchange to the gateway. Dedicated lines may be private or leased lines such as T1 lines, which are known by those skilled in the art. Or alternatively, the host may send its data feed to the gateway over a switched network such as a wide area network (WAN), Internet, PSTN, legacy networks that utilize X.25 protocol or also IBM LU6.2 SNA protocol, satellite broadcast systems that use leased satellite channels to broadcast price data, or a packet switched network, such as ATM or Frame relay, which are connection methods known by those skilled in the art. As noted above, the preferred embodiments are not limited to any particular network architecture. The foregoing examples are provided merely to illustrate the wide variety of networks to which the preferred embodiments may be applied.

According to the embodiment of FIG. 1, if there were five exchanges, then each exchange may have an associated gateway, and then according to this example there would be five gateways (i.e., X=Y). When a trader wants to participate in the market at two of the five exchanges, he or she may subscribe only to the data feeds that correspond to those two exchanges. If the trader decides to drop one of the exchanges or add another exchange, he or she may preferably do so at any time.

In another embodiment, each host exchange sends a data feed to a single gateway. For example, if there were five exchanges, then each exchange would send its data to the single gateway. Then, when a trader wants to participate at two of the five exchanges, he or she can simply subscribe to the data feeds that correspond to those two exchanges at the gateway. Also, if the trader decides to drop one of the exchanges or add another exchange, he or she may do so at any time. Of course, a hybrid system, in which multiple exchanges share a single gateway while other exchanges utilize distinct gateways, may alternatively be used.

In yet another embodiment, some exchanges may have multiple gateways, so that if there were five exchanges, then there might be three gateways supporting each of them; for fifteen gateways. This embodiment allows for a load balancing, among other benefits, of the gateways' workstations.

The preferred embodiments are not limited to any particular mathematical relationship between the number of host exchanges and the number of gateways. Those skilled in the art will appreciate that any of the foregoing examples, as well as combinations of these examples or entirely different architectures, may alternatively be used.

Gateway

As mentioned earlier, the gateway 102 is a computer (or program) that receives information from the host exchange. As used herein, a computer includes any device with memory and a processor capable of processing information to produce a desired result. Thus, a gateway can be a computer of any size such as a server, workstation, personal computer, or laptop, but generally, the gateway is any computer device that has the processing capability to perform the function described herein. Moreover, it should be understood that the functions of the gateway could be moved to the exchange and/or the client device to reduce or eliminate the need for a gateway.

In one embodiment, the gateway 102 receives a data feed 106 from an exchange 100. Preferably, the gateway 102 receives the data feed 106 and converts it to a form compatible with the protocols used by the client device 104 using conversion techniques known in the art. As known by those skilled in the art, the gateway 102 may have one or more servers to support the data feeds, such as a price server 114 for processing price information, an order server 116 for processing order information, and a fill server 118 for processing fill information. Generally, a server is a computer or program that responds to commands from a client in the form of subscriptions. The "servers" here may run on the same machine or may run on independent machines. A trader at a client device can subscribe to price information, order information, and fill information for that exchange. Once a client device has subscribed to the information, the gateway 102 publishes the information to the client device 104.

Client Device

As mentioned before, the client device 104 may be a computer or equivalent device, such as a workstation, that allows a trader to participate in the market hosted at the exchange. The client device 104 is not limited to any particular hardware and/or software, but rather may be any device that is capable of communicating with an exchange 100. For example, the client device 104 may be a personal computer, terminal, workstation, personal digital assistant ("PDA"), smart phone, or any other wired or wireless communication device.

In general, the client device uses software that creates specialized interactive trading screens on a terminal associated with the client device. The trading screens enable traders to enter and execute orders, obtain market quotes, and monitor positions. The range and quality of features available to the trader on his or her screens varies according to the specific software application being run. In addition to or in place of the interactive trading screens, the client device may run automated non-interactive types of trading applications.

A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static price axis. The preferred embodiments, however, are not limited to any particular trading application that performs the translation, storage and/or display functions. Portions of the X_TRADER® and the MD Trader™-style display are described in U.S. Pat. No. 6,772,132, entitled "Click Based Trading With Intuitive Grid Display of Market Depth," issued on Aug. 3, 2004, U.S. Pat. No. 6,938,011, entitled "Click Based Trading With Market Depth Display," issued on Aug. 30, 2005, and U.S. Pat. No. 7,127,424, entitled "Click Based Trading With Intuitive Grid Display of Market Depth and Price Consolidation," issued on Oct. 24, 2006, the contents of each of which are incorporated by reference herein. Moreover, the trading application may implement tools for trading tradeable objects that are described in U.S. Pat. No. 7,389,268 issued on Jun. 17, 2008, entitled "Trading Tools for Electronic Trading," the contents of which are incorporated by reference.

2. Spread Trading

As noted above, spread trading is the buying, selling, or combination of buying and selling, of two or more tradeable objects, the purpose of which is to capitalize on changes or movements in the relationships between the tradeable objects. A system and methods for performing automatic spread trading are described in U.S. Pat. No. 7,437,325, issued Oct. 14, 2008, the contents of which are incorporated herein by reference. In conjunction with the system and methods for performing automatic spread trading, U.S. Pat. No. 7,437,325 shows a trading window for spread trading and describes how the trading window may be configured and generated. It also describes how the trading window is populated with market data related to the spread and updated as the market moves with time.

Figure 2A:
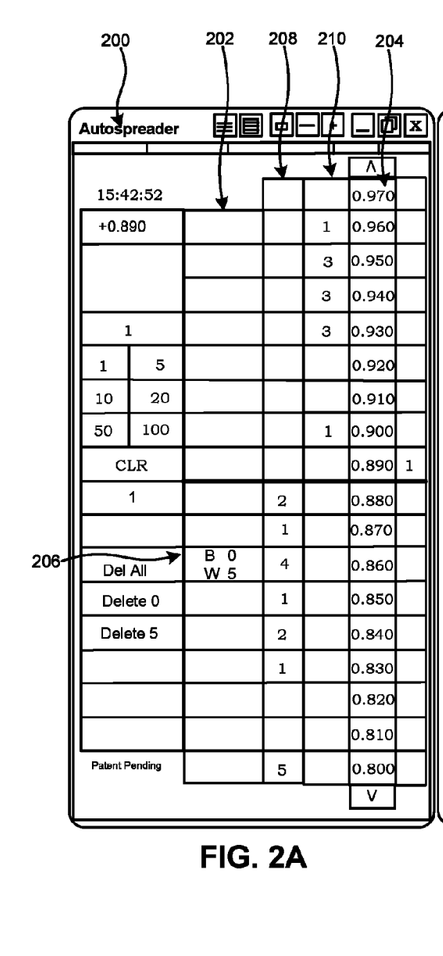
FIG. 2A is an example of a trading window 200 for spread trading.

FIG. 2A is an example of a trading window 200 for spread trading. The trading window 200 includes a working order column 202 to illustrate a trader's working orders in association with a price axis 204. In this example, the trader has a working order 206 to buy 5 of the spread at a price of 0.860. At least a portion of the pending orders in the market for the spread is also illustrated in this example. Specifically, the trading window 200 includes a bid quantity column 208 and an ask quantity column 210, which contain numerical indicators, in this example, for bid and ask quantities, respectively. As illustrated in FIG. 2A, the numerical indicators in the bid quantity column 208 and the ask quantity column 210 are displayed in association with a corresponding price level on the price axis 204.

As shown in U.S. Pat. No. 7,437,325, the price and quantity data displayed in columns 204, 208 and 210 may be derived from data feeds from one or more host exchanges 100. In particular, the spread data is calculated based on data associated with two or more tradeable objects, where the data associated with the two or more tradeable objects is supplied by one or more host exchanges. Each tradeable object that is included in the spread may be referred to herein as a "leg" of the spread.

Figure 2B:
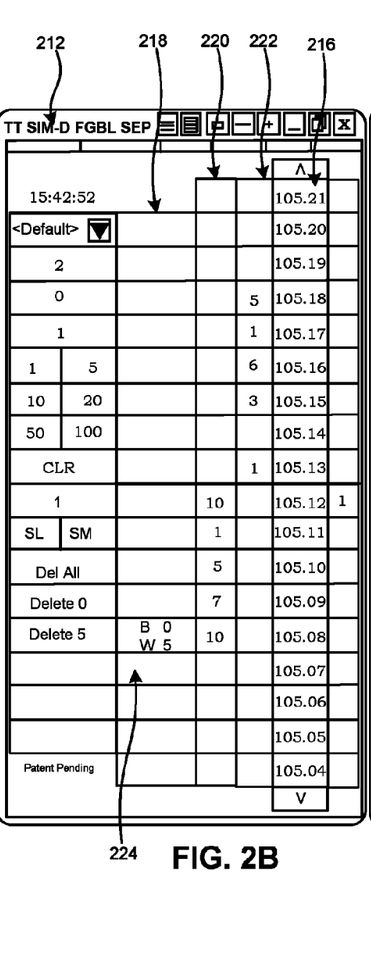
FIGS. 2B and 2C are trading windows for the tradeable objects, or legs, underlying the spread illustrated in FIG. 2A.
Figure 2C:
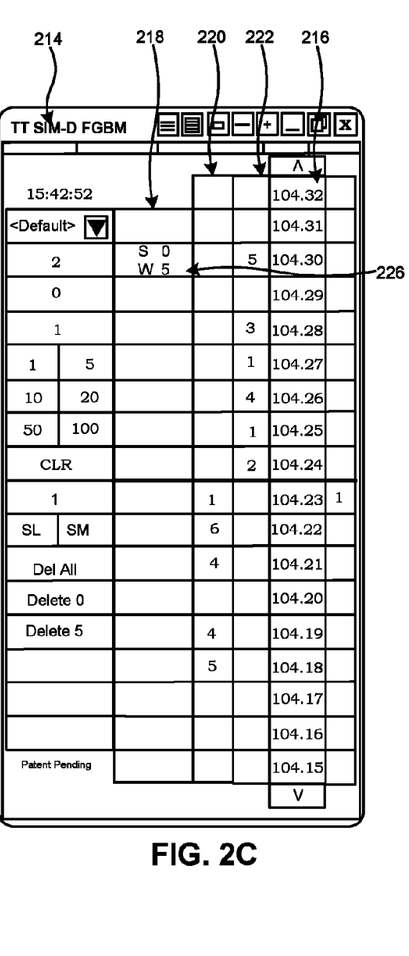

FIGS. 2B and 2C are trading windows 212, 214 for the tradeable objects, or legs, underlying the spread illustrated in FIG. 2A. Trading window 212 presents market data for the first leg of the spread, Product A, and trading window 214 presents market data for the second leg of the spread, Product B. Like the trading window 200, the trading windows 212 and 214 include a price axis 216, a working order column 218, a bid quantity column 220 and an ask quantity column 222.

When a trader enters the working order 206 in the spread trading window 200, corresponding working orders may be entered in the legs based on the spread configuration. In the two-legged spread example shown in FIGS. 2A through 2C, the automatic spreader enters corresponding working orders 224 and 226 in response to the trader's entry of the working order 206. Based on the spread configuration, a buy order 224 was quoted for Product A in trading window 212 and a sell order 226 was quoted for Product B in trading window 214. In this case, the buy order is quoted for 5 of Product A at a price level of 105.08, and the sell order is quoted for 5 of Product B at a price level of 104.30. FIGS. 2A-2C illustrate an example of quoting both legs of the spread, but alternatively, the automatic spreader may quote only one of the legs, or more than two legs. The number of legs that are actively quoted by the automatic spreader preferably depends on the user's spread configuration.

It should be understood that the trading windows 212 and 214 may or may not be displayed. Preferably, the user may decide whether or not to display the trading windows 212 and 214. For example, the user may desire to see where, in relation to the inside market, the working orders in the legs are entered. As another example, the user may desire to trade Product A, as well as the spread, and would therefore benefit from the display of a trading window for Product A.

As expressed earlier, the MD_TRADER™-style screen displays of the type illustrated in FIGS. 2A through 2C are described in the above-incorporated patents entitled "Click Based Trading With Intuitive Grid Display Of Market Depth," "Click Based Trading With Intuitive Grid Display of Market Depth and Price Consolidation," and "Trading Tools for Electronic Trading." It should be understood, however, that the preferred embodiments are not limited to this, or any other, particular type of screen display. Rather, the preferred embodiments may be readily adapted by those skilled in the art to a wide variety of screen displays and trading interfaces.

3. Transaction Toggling

Automatic trading tools often re-quote orders based on market movements. For example, the automatic spreader described in U.S. Pat. No. 7,437,325 may automatically re-quote the working order in one leg of a two-legged spread based on the movements of the inside market in the other leg. As described above, the automatic spreader actively quotes in one or more legs of the spread and for the example shown in FIGS. 2A through 2C quotes in both legs. In accordance with the preferred embodiments of the transaction toggler, however, an additional metric is considered prior to actively quoting in any of the legs. Specifically, prior to quoting in the legs of the spread, the transaction toggler determines the proximity of the corresponding working orders in the legs to the inside markets in the legs. If the corresponding working orders are not within a defined proximity limit to the inside market, then the transaction toggler prevents the working order from being sent to the host exchange. Preferably the proximity limit may be defined by the user. In one embodiment, the user may define separate proximity limits for the bid side and the ask side for each of the legs. The proximity limits may be set using a drop-down menu, a configuration window, such as the spread configuration window described in U.S. Pat. No. 7,437,325, or in any other manner.

The transaction toggler, therefore, provides several advantages to a trader using an automated trading tool. An example of a system and method for automated trading is provided in U.S. Patent Publication No. 2003/0236737, published on Dec. 25, 2003, the content of which is incorporated herein by reference. Automated trading tools often times quote at price levels that are relatively far away from the inside market, even when working orders at price levels that are not likely to be matched. For example in FIG. 2C, a sell order is quoted at a price level of 104.30, which is seven ticks away from the inside market. Thus, the user may accrue transaction fees from the host exchanges for quoting away from the inside market at price levels where it is unlikely that the orders will be matched. In addition, many host exchanges place a limit on the maximum number of times that a trader is allowed to quote in one trading period, e.g., the host exchanges may impose transaction quotas. Traders who exceed transaction quotas may be assessed fines. By constraining working orders to falling within the threshold proximity to the inside market, the automated trading tools may send fewer quotes and, those that are sent may be more likely to be matched.

Figure 3A:
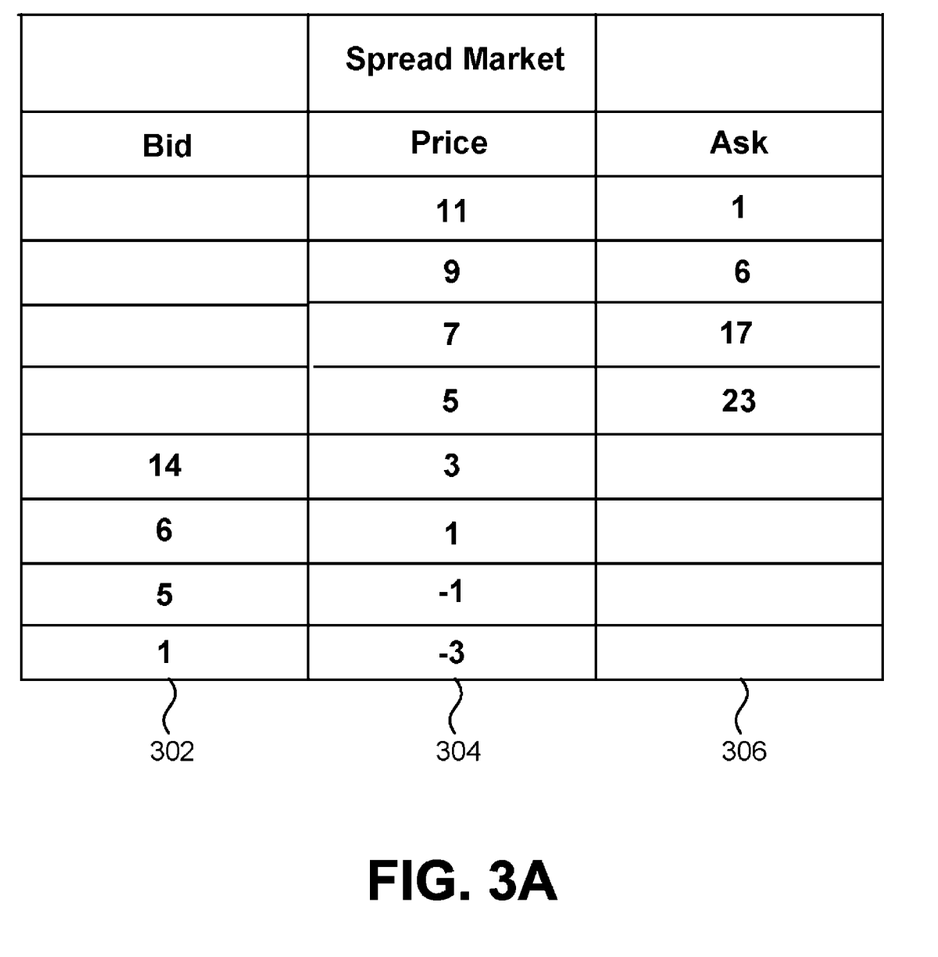
FIGS. 3A through 3C illustrate the use of a proximity limit for quote toggling.
Figure 3B:
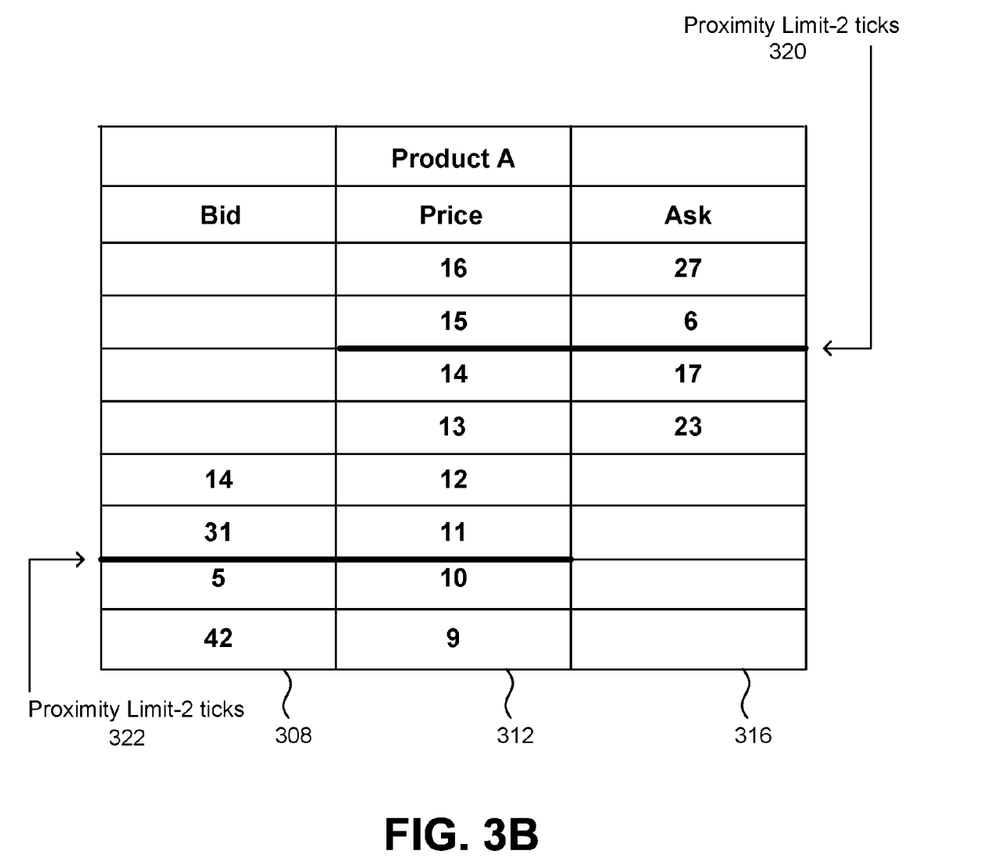
Figure 3C:
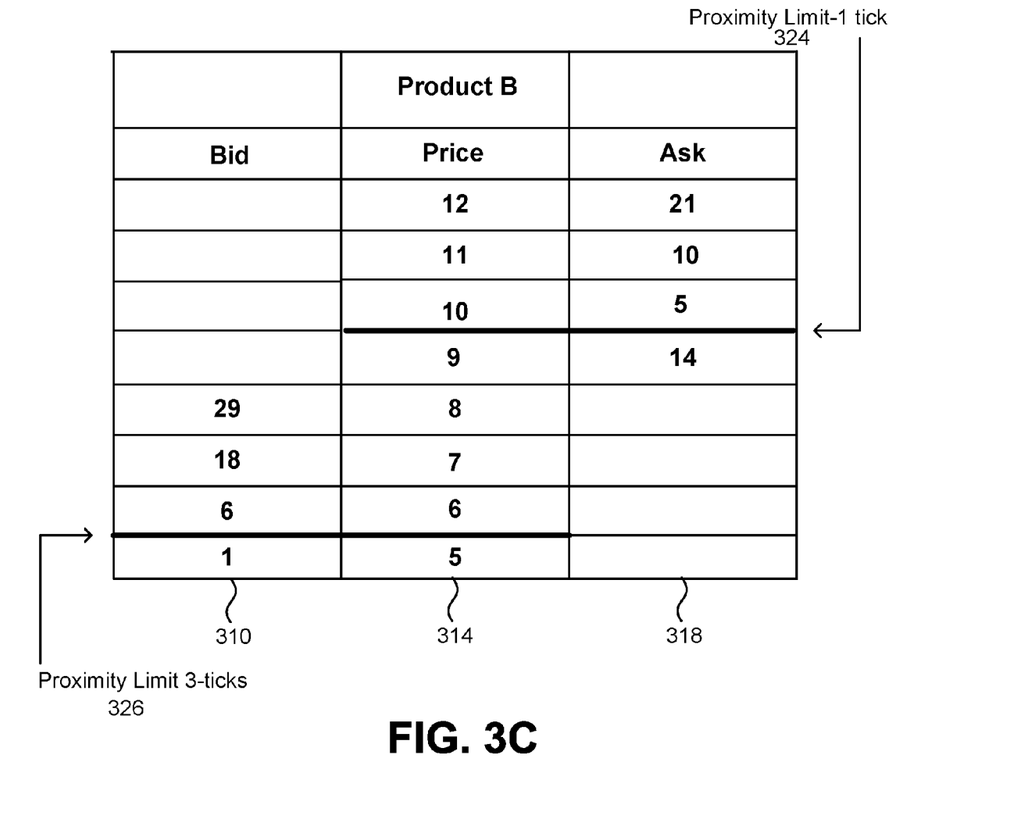

In accordance with a one preferred embodiment, the proximity limit is defined by the user, such as a trader, as being a pre-set number of ticks away from the inside market. FIGS. 3A through 3C illustrate the use of a proximity limit defined as a number of ticks. FIG. 3A illustrates a spread market, including a bid quantity column 302, a price axis 304 and an ask quantity column 306. FIGS. 3B and 3C illustrate the markets for the underlying tradeable objects, Product A and Product B, respectively, for the two-legged spread shown in FIG. 3A. FIGS. 3B and 3C likewise include a bid quantity column 308, 310, a price axis 312, 314, and an ask quantity column 316, 318. It will be recognized that the information presented in FIGS. 3A to 3C may be readily adapted for presentation in an interactive trading screen of the type shown in FIGS. 2A through 2C. The preferred embodiments, however, are not limited to this or any other specific type of trading screen. Rather, the market information may be presented in any type of display, or it may not be displayed to a user at all.

In configuring the spread, the user has selected proximity limits, which are illustrated in FIGS. 3B and 3C. For Product A, the ask proximity limit 320 is set at two ticks and the bid proximity limit 322 is set at two ticks. For Product B, the ask proximity limit 324 is set at one tick and the bid proximity limit 326 is set at 3 ticks.

An example of placing a spread order using a transaction toggler in the spread market of FIG. 3A will now be described. If a trader enters an order in the spread market to buy 1 spread at price level 3, and active quoting is selected for both legs, the automated spreader will try to work two orders. Assume that, based on the spread configuration, one of the two orders is an order to sell 1 Product B at price level 10. Because the ask proximity limit 324 is set at 1 tick, and price level 10 is not within that range, the transaction toggler prevents the order to sell Product B at 10 from being entered into the market, at least until the inside market shifts to fall within 1 tick from price level 10. Of course, during that time, the inside market for Product A may move, resulting in a new order to sell Product B at a different price level, to which the proximity limit would again be applied.

In accordance with another preferred embodiment, the proximity limit is defined by the user as being a pre-set cumulative depth away from the inside market. Cumulative depth, as the term is used herein, means the summation of quantities (either bid or ask) between the inside market and the price level at which an order is to be entered. If the depth between the inside market and the price level at which the order is to be entered exceeds the cumulative depth proximity limit, then the transaction toggler will prevent the order from being sent to the host exchange.

For example, referring again to FIGS. 3A through 3C, in configuring the spread assume that, for Product B, the ask proximity limit is set to a cumulative depth of 20 and the bid proximity limit is set to a cumulative depth of 35. If, as before, a trader enters an order in the spread market to buy 1 spread at price level 3, and active quoting is selected for both legs, the automated spreader will try to work two orders. Assume that, based on the spread configuration, one of the two orders is an order to sell 1 Product B at price level 10. The cumulative depth from the inside market to the price level 10 for Product B is 19 (a quantity of 14 at price level 9 and a quantity of 5 at price level 10). Thus, the transaction toggler would allow an order to sell I Product B at price level 10 to be sent to the host exchange.

The transaction toggler described herein may be readily incorporated into a wide variety of trading applications by those skilled in the art and its functionality will typically be implemented in software and/or firmware. Although the specific examples are provided in relation to an automated spreader, the preferred embodiments are not so limited, but rather may be usefully applied to any automated trading application that provides for the automated submission of quotes.

In the examples provided above, the proximity limit is static, i.e., a defined number of ticks or a cumulative depth. The preferred embodiments, however, are not limited to a transaction toggler using a static proximity limit, but rather any type of proximity limit may be defined. For example, a proximity limit may be defined by an equation that is applied to the trading application, either directly or indirectly, such as from a spreadsheet application. As just one example, a number may be scaled based on the volatility of the tradeable object to define a proximity limit, so that the proximity limit is greater for a more volatile tradeable object and smaller for a less volatile tradeable object.

As a further example, a proximity limit may be defined based upon a market for a different tradeable object, which may or may not be one of the legs of the spread in the automated spreader example. For instance, a trader who is setting a proximity limit for one tradeable object, Product C, may perceive the different tradeable object, Product D, as an indicator of the likely short-term performance of Product C. The proximity limit for Product C may then be defined in any number of ways.

In one embodiment, the quote for Product C is translated into a hypothetical quote for Product D, in accordance with some relationship between Product C and Product D that is defined by the user. The transaction toggler may then allow the quote for Product C to be submitted when the hypothetical quote for Product D falls within the defined proximity limit applied to Product D.

Alternatively, the proximity limit in Product C may adjust dynamically based upon the market for Product D. For example, if Product C and Product D are the same tradeable object but they are traded at different exchanges (in this case, Product C and Product D may be defined to have a 1:1 relationship), and the exchange at which Product D trades is perceived to be a deeper market, such that the price of Product C may be expected to follow the price of Product D, and the proximity limit for Product C is defined as two ticks, then the transaction toggler may allow submission of a quote that is three ticks away in the market for Product C if the quote is within two ticks in the market for Product D.

In yet other embodiments, a proximity limit is time-dependent. For example, the proximity limit may be set by a user to change in accordance with the time of day. The time of day may effect a trader's willingness to quote in a variety of ways. For instance, a trader may want to apply a different proximity limit at the opening or at a time during the trading day when economic numbers are scheduled to be published. The trader may therefore define a time window during which a different proximity limit is applied. As examples, the proximity limit may be set such that no quotes are submitted during the window, or the proximity limit may be removed during the window such that all quotes are submitted. Of course, the proximity limit may be set at any value between these extremes. In another example of using a time-dependent proximity limit, the transaction toggler checks, before submitting a new quote, how long it has been since the previous quote was submitted. For example, the transaction toggler may prevent the submission of a new quote within, e.g., 5 seconds of the last quote.

Furthermore, other features may be associated with the transaction toggler. For example, in instances where the transaction toggler prevents submission of an order to the host exchange, the user may be provided notice by the trading application. In one alternative, the user may be provided with the opportunity, after notice or without notice, to override the transaction toggler such that the automated orders will not be blocked. As another example, the trader may be allowed to define, such as by a configuration parameter, a maximum number of times that an order may be toggled on and off. For this example, the trader may define what happens if the order exceeds the maximum number of toggles. One alternative removes the proximity limits when the maximum number is exceeded. In another alternative, the transaction toggler stops quoting.

In another alternative, the transaction toggler may respond differently depending upon whether an order has already been submitted to the host exchange. For example, if an order has already been submitted the transaction toggler may not toggle off when the previously submitted order moves outside of the proximity limit. Alternatively, the order may be cancelled if it moves outside the proximity limit and remains outside the proximity limit for a predetermined time. As a further alternative, separate proximity limits may be applied for i) placing an initial order, and ii) applying to an existing order that moves out of range.

In addition, it should be appreciated that it is not necessary that the proximity limit be measured from the inside market as shown in the examples. For example, the proximity limit may be measured from another reference point, such as the last traded price. Any other reference point of use to the trader may alternatively be used.

It should be understood that the foregoing description of the use of a proximity limit may be applied to any automated transaction, including the submission of quotes, orders and the like. Those skilled in the art will recognize that the submission of a new quote or order may or may not include a concurrent request to delete, cancel/replace or modify a previously submitted quote or order.

Furthermore, it should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are examples only, and should not be taken as limiting the scope of the present invention. The claims should not be read as limited to the described order or elements unless stated to that effect. Thus, all variations that come within the scope and spirit of the following claims and equivalents thereto are claimed as the invention.

The invention claimed is:

1. A method for submitting orders from an automated trading tool to an electronic exchange, the method comprising:
   generating, via a computer device, an order message for an order to trade a first tradeable object with a price based on a spread price and an inside market for a second tradeable object, where the spread price is for a spread between the first tradeable object and the second tradeable object, and where the inside market for the second tradeable object includes a highest bid price for the second tradeable object and a lowest ask price for the second tradeable object;
   determining a price range via the computer device, the price range determined according to a proximity limit and a reference price for the first tradeable object;
   comparing, via the computer device, the price with the price range; and
   submitting, via the computer device, the order message to the electronic exchange according to comparing the price with the price range.

2. The method of claim 1 where the proximity limit is based on a number of ticks away from the reference price.

3. The method of claim 2 where the number of ticks is selectable.

4. The method of claim 3 where the number of ticks selected by a user.

5. The method of claim 2 where the number of ticks comprises a first number of ticks greater than the reference price and a second number of ticks less than the reference price.

6. The method of claim 5 where the first number of ticks and the second number of ticks are different.

7. The method of claim 1 where submitting the order to the electronic exchange according to comparing the price with the price range further comprises blocking the order from being submitted when the price is outside the price range.

8. The method of claim 1 where submitting the order to the electronic exchange according to comparing the price with the price range further comprises submitting the order when the price is within the price range.

9. The method of claim 1 where the reference price is based on a price in market data corresponding to the first tradeable object.

10. The method of claim 1 where the reference price comprises an inside market for the first tradeable object having a highest bid price for the first tradeable object and a lowest ask price for the first tradeable object.

11. The method of claim 1 where the reference price comprises a last traded price for the first tradeable object.

12. The method of claim 1 where the proximity limit is based on any of a cumulative depth, time, and an equation.

13. The method of claim 1 where the first tradeable object and the second tradeable object are substantially the same.

14. The method of claim 1 where the first tradeable object and the second tradeable object are different.

15. The method of claim 1, further comprising adjusting the proximity limit based on a market for the second tradeable object.

16. The method of claim 1 where the order comprises a new working order to trade the first tradeable object.

17. The method of claim 1 where the order replaces an existing working order to trade the first tradeable object.

18. A computer readable medium having instructions stored therein for causing a processor to carry out acts comprising:
   generating, via a computer device, an order message for an order to trade a first tradeable object with a price based on a spread price and an inside market for a second tradeable object, where the spread price is for a spread between the first tradeable object and the second tradeable object, and where the inside market for the second tradeable object includes a highest bid price for the second tradeable object and a lowest ask price for the second tradeable object;
   determining a price range via the computer device, the price range determined according to a proximity limit and a reference price for the first tradeable object;
   comparing, via the computer device, the price with the price range; and
   submitting, via the computer device, the order message to the electronic exchange according to comparing the price with the price range.

19. A method for submitting orders from an automated trading tool to an electronic exchange, the method comprising:

generating, via a computer device, a first order message for a first order for a first tradeable object with a first price based on a spread price and an inside market for a second tradeable object, where the spread price is for a spread between the first tradeable object and the second tradeable object, and where the inside market for the second tradeable object includes a highest bid price for the second tradeable object and a lowest ask price for the second tradeable object;

generating, via the computer device, a second order message for a second order for the second tradeable with a second price based on the spread price and an inside market for the first tradeable object, where the inside market for the first tradeable object includes a highest bid price for the first tradeable object and a lowest ask price for the first tradeable object;

comparing the first price with a first price range via the computer device, the first price range determined according to a first proximity limit for the first tradeable object and a first reference price for the first tradeable object;

comparing the second price with a second price range via the computer device, the second price range determined according to a second proximity limit for the second tradeable object and a second reference price for the second tradeable object; and submitting the first order message to the electronic exchange according to comparing the first price with the first price range and the second order message to the electronic exchange according to comparing the second price with the second price range.

20. The method of claim 19 where submitting the first order to the electronic exchange according to comparing the first price with the first price range further comprises blocking the first order from being submitted when the first price is outside the first price range and where submitting the second order to the electronic exchange according to comparing the second price with the second price range further comprises blocking the second order from being submitted when the second price is outside the second price range.

21. The method of claim 19 where submitting the first order to the electronic exchange according to comparing the first price with the first price range further comprises submitting the first order when the first price is within the first price range and where submitting the second order to the electronic exchange according to comparing the second price with the second price range further comprises submitting the second order when the second price is within the second price range.

\* \* \* \* \*